UNITED STATES PATENT OFFICE.

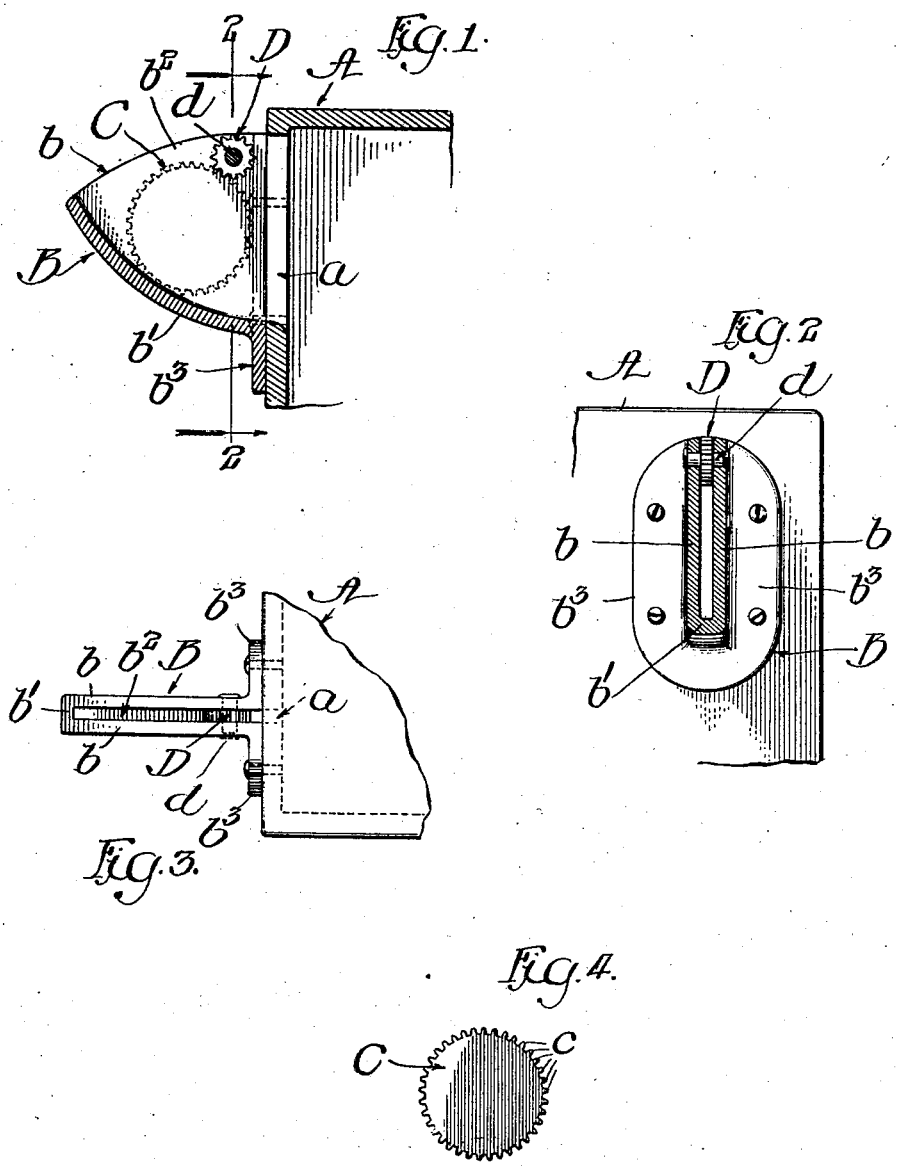

MAX MENDELSOHN, OF CHICAGO, ILLINOIS.

CHECK-CHUTE GUARD AND CHECK.

No. 912,591.  Specification of Letters Patent.  Patented Feb. 16, 1909.

Application filed November 25, 1907. Serial No. 403,617.

*To all whom it may concern:*

Be it known that I, MAX MENDELSOHN, a citizen of the United States, of Chicago, in the county of Cook and State of Illinois, have invented certain new and useful Improvements in Check-Chute Guards and Checks; and I do hereby declare that the following is a full, clear, and exact description thereof, reference being had to the accompanying drawings, and to the letters of reference marked thereon, which form a part of this specification.

This invention relates to improvements in check controlled apparatus, and the invention refers more specifically to a novel construction and arrangement of a device in the nature of a guard for controlling the passage of a check or "slug" through the check receiving chute, and to the combination with such a guard of a peculiar form of check or "slug" adapted for use therewith.

The invention consists in the matters hereinafter set forth and more particularly pointed out in the appended claims.

Among the objects of my invention is to provide a simple and efficient check and guard therefor which will prevent the use of a check other than that of the peculiar form adapted thereto and which will facilitate the insertion of the check into and its passage through the chute.

In the drawings:—Figure 1 is a fragmentary sectional view of a check receiving chute embodying my invention, showing the same as mounted on a coin box or casing which incloses a check controlled mechanism. Fig. 2 is a section, taken on line 2—2 of Fig. 1. Fig. 3 is a plan view of the parts shown in Figs. 1 and 2. Fig. 4 is a side elevation of a form of check adapted for use with my novel check guard.

As shown in the drawings, A designates a box or receptacle, which may be the box inclosing a check controlled telephone instrument or other mechanism, and B designates a chute through which the checks are inserted into said box. The box is provided in its wall with a slot $a$ through which the checks are delivered to the check controlled mechanism inclosed in the box. The chute B comprises side walls $b$ $b$, between which is formed the slot or passage of the chute, and a bottom wall $b^1$, and the chute is open at its top to provide an opening or throat $b^2$ to receive the check or "slug." Said chute is formed with flanges $b^3$ $b^3$ by which it is attached to the box A or other suitable support, as by means of screws. C designates a check or "slug" which is designed to be inserted through said coin chute and is directed thereby to the check controlled mechanism within the box A, (not shown) the operation of which mechanism is controlled by said check. In accordance with my invention the said check or "slug" C is provided with a plurality of peripheral indentations separated by teeth or projections $c$ and the chute is provided at one side of the slot or throat thereof with a guard so constructed and arranged as to prevent the passage therethrough of a check of a diameter equal to the over all diameter of the check herein shown, but having a different peripheral contour. The said guard is so constructed as to be received or partially received by one or more of the notches or spaces between the teeth or projections $c$ of said check, whereby said check is permitted to pass between the guard and the wall of the chute opposite to the guard. As herein shown, the said guard is located at the side of the chute remote from the wall $b^1$ thereof, it being located at the rear end of the chute slot.

The form of guard which I have chosen to illustrate consists of a toothed pinion D which is rotatively mounted on a transverse pin or shaft $d$ which extends between and is fixed in the side walls $b$ $b$ of said chute. The said pinion is of such outside diameter and is so located with respect to the wall $b^1$ of the chute that the distance between the ends of the teeth thereof and the wall $b^1$ is less than the over all diameter of the check. By reason of the intermeshing of the teeth of the check with the teeth of the guard pinion, D, however, the toothed or notched check is permitted to pass said guard, during which passage the pinion is rotated on the shaft $d$ and the check partakes of an opposite rotation. The said guard pinion rotates freely on its shaft and the check operates by gravity, as it passes through the chute, to rotate the intermeshing guard pinion and check. It is thus made obvious that the guard device effectively prevents the passage through the chute of an unnotched check of the same diameter as the check shown, or a check having a peripheral contour differing substantially in character from the notches or teeth of the guard D. The said teeth or projections of the check and guard are preferably pointed so as to prevent clashing of said parts when the check is inserted into the chute.

A general advantage of the form of check and guard herein shown, provided with a plurality of intermeshing, closely spaced peripheral teeth or projections, is that the check passes through the chute as readily as an unnotched or plain check will pass through a plain coin chute of a check controlled mechanism, it being obvious that the teeth or projections of the two parts are automatically brought into interfitting or meshing relation by the act of placing the check in the throat of the chute, and that the gravity of the check will carry it directly into the box through the slot $a$. It will also be furthermore observed that a check of a like diameter such as is required to operate the check controlled mechanism, cannot be passed through the chute by reason of the fact that the guard will effectively bar its entrance into or passage through the chute.

Circular checks have heretofore been employed for operating coin controlled mechanisms and provided with projections or notches adapted for interfitting engagement with specially formed guards arranged at the mouth of the check receiving chute of a character to prevent a check other than the one formed to interfit therewith to pass into the chute. In all such prior checks and guards, so far as I am aware, however, the check must be presented to the chute in a certain position in order to bring the check into proper interfitting engagement with the guard to permit the check to pass the same. An inconvenience to be noted in the use of such check is that close attention must be given to the check when the same is to be placed in the chute in order to properly present the same to the chute for entrance thereto, and this disadvantage is greatly increased in case the coin controlled mechanism, such as a telephone, be located in an inclosed booth where insufficient light is provided. As a result of prior constructions, when used in connection with telephone toll boxes, it often occurs that "central" calls for the check before the user has discovered the manner in which the check should be presented to the chute, thus resulting in an inconvenient delay and annoyance to both the user and "central". My improved check may be delivered to the chute as readily as a coin or other form of check or slug may be placed in an unguarded coin or check chute.

It will be understood that the invention may be embraced in structural forms differing somewhat from the form herein illustrated and the guard may be otherwise made and arranged, and is not limited to the precise details shown except as hereinafter made the subject of specific claims.

I claim as my invention:—

1. The combination with a check receiving chute of a check controlled mechanism, of a guard extending transversely across the opening or throat of the chute at one side thereof, the other side of the guard or opening being unobstructed to receive a check, and a circular check arranged to pass through said slot, said check being provided entirely around its periphery with a plurality of closely spaced projections and intervening notches which extend transversely across the width of the periphery, said notched portion of the periphery being arranged to mesh with the transverse guard of the chute and the overall dimension of the check being greater than the distance between said guard and the opposite unobstructed side of the throat or opening of the chute.

2. The combination with a check receiving chute of a check controlled mechanism, having means for attaching it to the casing of the mechanism with its throat in line with a slot in said casing, said throat opening upwardly to receive a check, of a guard extending transversely across one side of the throat of the chute, at a point in front of the slot in said casing, the other side of the throat being free and unobstructed, and a circular check arranged to roll by gravity through said chute and provided entirely around its periphery with a plurality of closely spaced notches which extend across the transverse width of said periphery and adapted for meshing engagement with said guard.

In testimony, that I claim the foregoing as my invention I affix my signature in the presence of two witnesses, this 23rd day of November A. D. 1907.

MAX MENDELSOHN

Witnesses:
 W. L. HALL,
 S. D. HIRSCHEL.